(12) United States Patent
Hu et al.

(10) Patent No.: US 7,830,608 B2
(45) Date of Patent: *Nov. 9, 2010

(54) MULTIPLE EMITTER COUPLING DEVICES AND METHODS WITH BEAM TRANSFORM SYSTEM

(75) Inventors: Yongdan Hu, Tucson, AZ (US); Edmund L. Wolak, Palo Alto, CA (US)

(73) Assignee: Oclaro Photonics, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/747,172

(22) Filed: May 10, 2007

(65) Prior Publication Data

US 2007/0268571 A1 Nov. 22, 2007

Related U.S. Application Data

(60) Provisional application No. 60/801,845, filed on May 20, 2006.

(51) Int. Cl.
*G02B 27/10* (2006.01)
*G02B 27/30* (2006.01)
(52) U.S. Cl. .................................. 359/641; 359/618
(58) Field of Classification Search ................. 359/641, 359/618, 623, 625, 640, 636, 638; 372/97, 372/107, 108; 385/36
See application file for complete search history.

(56) References Cited

U.S. PATENT DOCUMENTS

| | | |
|---|---|---|
| 4,428,647 A | 1/1984 | Sprague |
| 4,763,975 A | 8/1988 | Scifres et al. |
| 5,127,068 A | 6/1992 | Baer |
| 5,144,486 A | 9/1992 | Hart |
| 5,168,401 A | 12/1992 | Endriz |
| 5,230,969 A | 7/1993 | Savant et al. |
| 5,243,619 A | 9/1993 | Albers et al. |
| 5,365,366 A | 11/1994 | Kafka et al. |
| 5,367,529 A | 11/1994 | Holsinger et al. |
| 5,446,749 A | 8/1995 | Nighan et al. |
| 5,513,201 A | 4/1996 | Yamaguchi |
| 5,579,422 A | 11/1996 | Head et al. |
| 5,691,989 A | 11/1997 | Rakuljic et al. |
| 5,740,288 A | 4/1998 | Pan |
| 5,787,107 A | 7/1998 | Leger |
| 5,808,323 A | 9/1998 | Spaeth |

(Continued)

FOREIGN PATENT DOCUMENTS

JP 0411233857 A 8/1999

(Continued)

OTHER PUBLICATIONS

PCT International Search Report and Written Opinion for PCT/US2007/068717 Completed: Nov. 26, 2007.

(Continued)

*Primary Examiner*—Alicia M Harrington
(74) *Attorney, Agent, or Firm*—Grant Anderson LLP

(57) ABSTRACT

Methods and devices for coupling the output of multiple emitters of a laser diode bar using a beam transform system with high brightness and coupling efficiency. Some embodiments may include wavelength locking with devices such as VBGs and other suitable devices and methods.

1 Claim, 7 Drawing Sheets

U.S. PATENT DOCUMENTS

| | | | |
|---|---|---|---|
| 5,825,551 A | 10/1998 | Clarkson | |
| 5,832,150 A | 11/1998 | Flint | |
| 5,986,794 A | 11/1999 | Krause | |
| 5,999,544 A | 12/1999 | Petersen | |
| 6,044,096 A | 3/2000 | Wolak et al. | |
| 6,160,664 A | 12/2000 | Du et al. | |
| 6,175,452 B1 | 1/2001 | Ullmann et al. | |
| 6,215,598 B1 | 4/2001 | Hwu | |
| 6,314,116 B1 | 11/2001 | Wright et al. | |
| 6,331,692 B1 | 12/2001 | Krause et al. | |
| 6,337,873 B1 | 1/2002 | Goering et al. | |
| 6,356,380 B1 | 3/2002 | Whitney | |
| 6,356,577 B1 | 3/2002 | Miller | |
| 6,493,148 B1 | 12/2002 | Anikitchev | |
| 6,516,011 B1 | 2/2003 | Treusch | |
| 6,594,092 B2 | 7/2003 | von Freyhold et al. | |
| 6,600,605 B1 | 7/2003 | Anikitchev | |
| 6,768,593 B1 | 7/2004 | Jutamulia | |
| 6,771,686 B1 | 8/2004 | Ullman et al. | |
| 6,831,778 B2 | 12/2004 | Yang et al. | |
| 6,876,784 B2 | 4/2005 | Nikolov et al. | |
| 6,888,679 B2 | 5/2005 | Brown | |
| 6,897,486 B2 | 5/2005 | Loh | |
| 6,919,990 B2 | 7/2005 | Anikitchev et al. | |
| 6,922,288 B2 | 7/2005 | Yamanka et al. | |
| 6,931,037 B2 | 8/2005 | Nighan et al. | |
| 6,969,206 B2 | 11/2005 | Iwanaga et al. | |
| 6,977,769 B2 | 12/2005 | Matsushita et al. | |
| 6,985,648 B2 | 1/2006 | Kish et al. | |
| 6,993,059 B2 | 1/2006 | Anikitchev et al. | |
| 7,006,194 B2 | 2/2006 | Sumiyoshi et al. | |
| 7,006,549 B2 | 2/2006 | Anikitchev et al. | |
| 7,010,194 B2 | 3/2006 | Anikitchev et al. | |
| 7,065,105 B2 | 6/2006 | Ehlers et al. | |
| 7,244,965 B2 | 7/2007 | Andrews et al. | |
| 2004/0095983 A1 | 5/2004 | Whitley | |
| 2004/0252744 A1 | 12/2004 | Anikitchev et al. | |
| 2005/0018743 A1 | 1/2005 | Volodin et al. | |
| 2005/0069255 A1* | 3/2005 | Nishimura et al. | 385/31 |
| 2005/0248819 A1 | 11/2005 | Hymel et al. | |
| 2005/0248820 A1 | 11/2005 | Moser et al. | |
| 2006/0039418 A1 | 2/2006 | Anikitchev et al. | |
| 2006/0045143 A1 | 3/2006 | Anikitchev et al. | |
| 2006/0114955 A1 | 6/2006 | Steckman | |
| 2006/0126690 A1 | 6/2006 | Kido et al. | |
| 2006/0263004 A1 | 11/2006 | Klimek et al. | |
| 2006/0280209 A1 | 12/2006 | Treusch et al. | |
| 2007/0268572 A1 | 11/2007 | Hu et al. | |
| 2007/0291373 A1 | 12/2007 | Hu | |
| 2007/0291813 A1 | 12/2007 | Hu et al. | |
| 2008/0101429 A1* | 5/2008 | Sipes | 372/50.12 |

FOREIGN PATENT DOCUMENTS

| | | |
|---|---|---|
| JP | 2002148491 A | 5/2002 |
| WO | WO9949343 | 3/1999 |

OTHER PUBLICATIONS

Becht, Vector phase conjugation for beam combining in a pulsed Nd:YAG laser system, Proceedings of the SPIE—The International Society for Optical Engineering, 3263:11-19 (1998).

Fuhr, Polarization power summing in laser diode communication systems, SPIE 740:70-76 (1987).

Headley et al., Tapered Fiber bundles for combining laser pumps., Proceedings of the SPIE—The International Society for Optical Engineering, 5709(1):263-272 (200).

Knitsch et al., Diode Laser Modules of Highest Brilliance for Materials Processing, Proceedings of the SPIE, vol. 4651:256-263 (2002).

Mecherle, Laser diode combining for free space optical communication, Proceedings of the SPIE—The International Society for Optical Engineering, 616:281-291 (1986).

Miyajima et al., Single Wavelength 5.6 Direct Diode Laser with a High-Efficiency Beam Combination, Jpn. J. Appl. Phys., 43(8):5269-5272 (2004).

Moser et al., "Volume Bragg Grating Devices," Friday Morning Optical Fiber Communications Conference, 2003, OFC 2003 pp. 644-645, vol. 2, Mar. 28, 2003.

Ondax, Inc., "Volume Holographic Gratings (VHG)," 2005 pp. 1-7.

Rothenberg, Polarization beam smoothing for ineertial confinement fusion, J. Applied Physics, 87(8):3654-3662 (2000).

Sincerbox, Laser Beam Combining, IBM Technical Disclosure Bulletin, 12(10):1663-1664 (1970).

Thestrup et al, High brightness laser source based on polarization coupling of two diode lasers with asymmetric feedback, Applied Physics Letters, 82(5):680-682 (2003).

Treusch et al., High-Brightness Semiconductor Laser Sources for Materials Processing: Stacking, Beam Shaping, and Bars, IEEE Journal of Selected Topics in Quantum Electronics, 6(4):601-614 (2000).

Office Action mailed on Jul. 8, 2009 for U.S. Appl. No. 11/747,184 filed: May 10, 2007 published as: US 2007/0268572 A1 on Nov. 22, 2007.

Office Action mailed on Aug. 24, 2009 for U.S. Appl. No. 11/761,901 filed: Jun. 12, 2007 published as: US 2007/0291813 A1 on Dec. 20, 2007.

Valdor Fiber Optics Catalog #910-00001, pp. 1-2 Impact Mount Singlemode Laser Pigtails. Printed from the internet: Dec. 22, 2006.

International Search Report and Written Opinion mailed on Dec. 28, 2009 for International Application No.: PCT/US2009/043182 filed on: May 7, 2009 and published as: WO/2009/137703 on: Nov. 12, 2009.

* cited by examiner

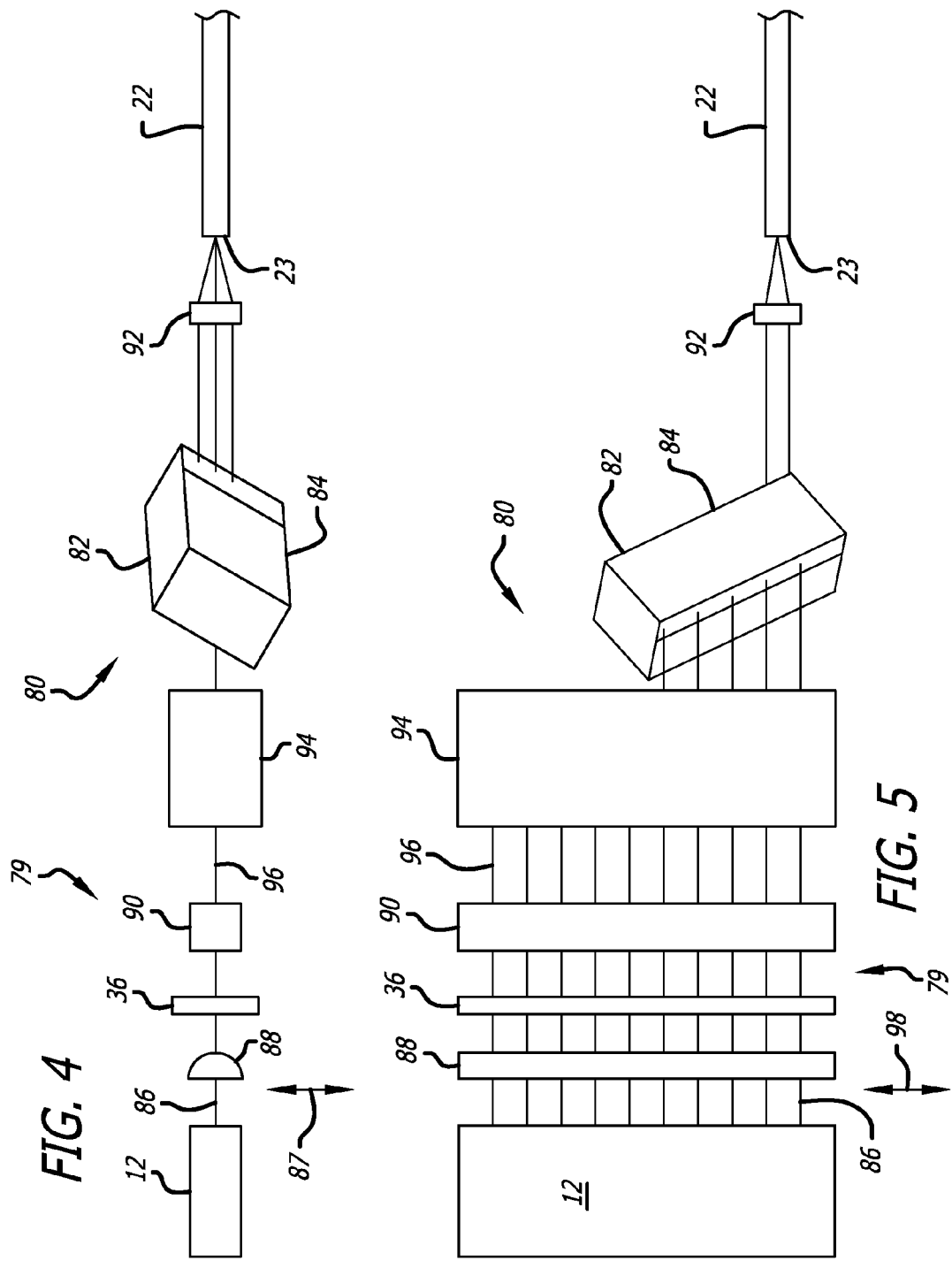

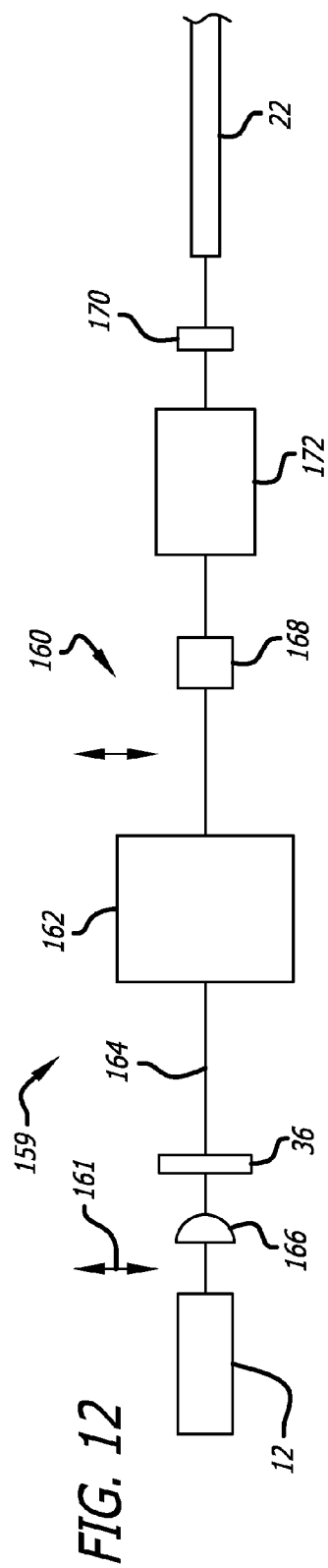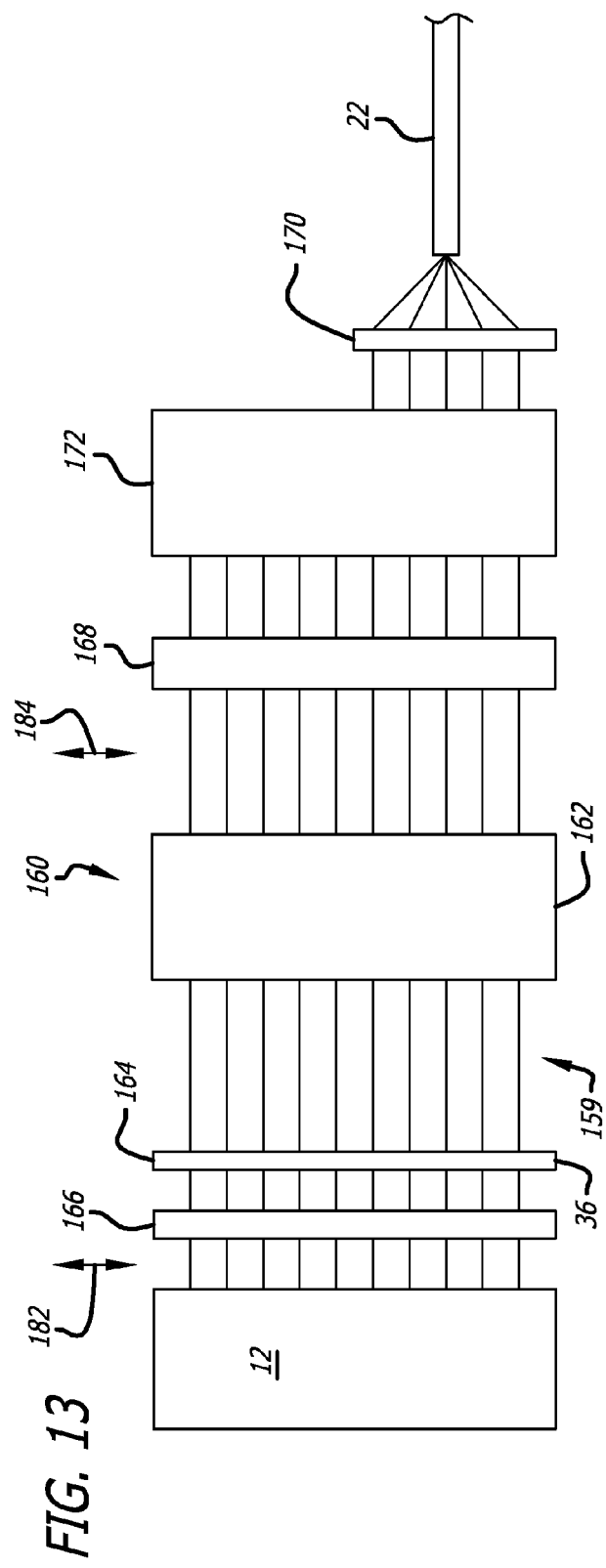

MULTIPLE EMITTER COUPLING DEVICES AND METHODS WITH BEAM TRANSFORM SYSTEM

RELATED APPLICATIONS

This application claims priority under 35 U.S.C. section 119(e) from U.S. provisional application Ser. No. 60/801,845 filed May 20, 2006, by Yongdan Hu et al. titled "Multiple Emitter Coupling Devices and Methods with Beam Transform System" which is incorporated by reference herein in its entirety.

BACKGROUND

Certain applications requiring laser energy may benefit from the use of solid state laser sources such as laser diodes which are commonly available, reliable to operate and relatively cost effective as a laser energy source. Such devices may include a plurality of laser emitters in a single bar that emit laser light simultaneously in a common direction. Typically the emitters of such a diode bar are spaced from each other sufficiently to allow sufficient cooling without the need for elaborate and expensive cooling systems, such as fluid cooling systems which are also expensive and time consuming to maintain.

Laser diode bars are often used for communication technology devices and medical applications where it is desirable to couple the output of all the emitters of a single laser diode bar into a single optical fiber. The spatial distribution of the emitters of a laser diode bar can make coupling the output of multiple emitters challenging, particularly when coupling to a small diameter optical fiber. One of the challenges of coupling the output of the emitters of a laser diode bar is maintaining brightness of the emitters in the coupling process.

As such, what has been needed are methods and devices for coupling the output of multiple emitters of a laser diode bar while maintaining a high degree of brightness and coupling efficiency.

SUMMARY

Some embodiments of a coupling system for coupling at least two output beams of solid state emitters include a fast axis collimator disposed within an optical train of the at least two output beams, a slow axis collimator disposed within the optical train of the at least two output beams and a beam transform system disposed within the optical train of the at least two output beams. For some embodiments, the emitters include laser diode emitters which may be disposed within a single laser diode bar. Some embodiments also include a wavelength locking element that may be a volume Bragg grating (VBG).

Some embodiments of a coupling system for coupling at least two output beams of solid state emitters include a first fast axis collimator, a first slow axis collimator and a first beam transform system disposed all disposed within a first optical axis. A second fast axis collimator, a second slow axis collimator and a second beam transform system are all disposed within a second optical axis. A beam combiner includes a first input which is optically coupled to the first optical axis, a second input which is optically coupled to the second optical axis and an output axis. Focusing optics are optically coupled to the output axis of the beam combiner. In some embodiments, the first optical axis and the second optical axis are substantially orthogonal to each other and the first optical axis and the output axis of the beam combiner may be substantially colinear.

In some embodiments, a method of coupling the output of at least two emitters of a laser diode bar include collimating the output beams of the emitters along a fast axis, collimating the output beams of the emitters along a slow axis, and transforming the output beams of each emitter by passing the output through a beam transform system. Once the beam has been transformed by the beam transform system, the output beams are focused into an optical conduit input. In some embodiments, the output beams may also be folded by passing the output beams through a beam combiner which may be a polarization beam combiner.

In some embodiments of a method of normalizing the beam product of an output of a plurality of emitters of a laser bar includes collimating the output of the emitters along a fast axis, collimating the output of the emitters along a slow axis and transforming the output of each emitter by passing the output through a beam transform system.

These features of embodiments will become more apparent from the following detailed description when taken in conjunction with the accompanying exemplary drawings.

BRIEF DESCRIPTION OF THE DRAWINGS

FIG. 4 is a side diagrammatic view of an embodiment of a coupling system.

FIG. 5 is a top diagrammatic view of the coupling system of FIG. 4.

FIG. 12 is a side diagrammatic view of an embodiment of a coupling device.

FIG. 13 is a top diagrammatic view of the coupling device of FIG. 12.

DETAILED DESCRIPTION

Figure 1:
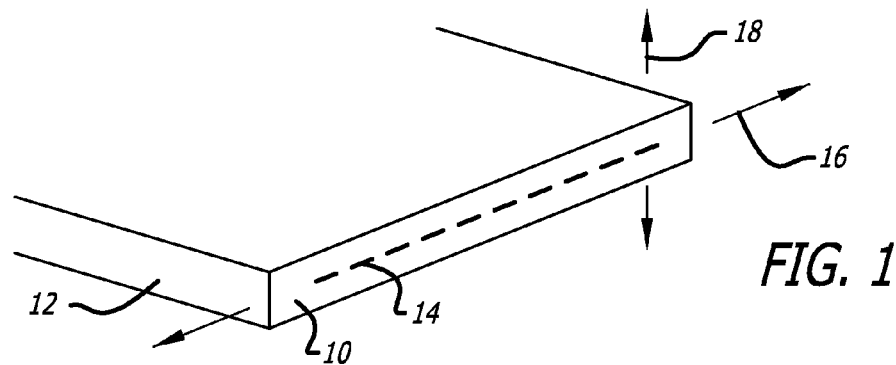
FIG. 1 is a perspective view of an output surface of a laser diode bar.

FIG. 1 is a perspective view of an output surface 10 of a laser diode bar 12 that includes a total of ten emitters 14 disposed adjacent each other. The emitters 14 are disposed in a linear row along a slow axis direction of the emitters 14, indicated by arrow 16. The emitters 14 are positioned or otherwise configured so as to emit light energy in output beams that behave and propagate substantially similar to each other. A fast axis of the emitters 14 is indicated by arrow 18. Some embodiments of the laser diode bar 12 may have emitters 14 that emit light having a frequency of about 700 nm to about 1500 nm, more specifically, about 800 nm to about 1000 nm. Although such a laser diode bar 12 may have any suitable number of emitters 14, such as about 2 emitters 14 to about 100 emitters 14, more specifically, about 10 to about 50, some embodiments of bar 12 may include about 10, 19, 37 or 48 emitters 14. For some embodiments, a laser diode bar 12 having about ten emitters 14 may have an output power of about 10 W to about 100 W, more specifically, about 20 W to about 40 W. As discussed above, it may be desirable to couple output beams from the emitters 14 of a laser diode bar 12, or any other suitable bar or source having a plurality of emitters 14 in a similar linear configuration with substantially similar output beams, into an optical conduit, such as an optical fiber. Some embodiments of the emitters 14 may have a width of about 50 microns to about 300 microns, a height of about 1 micron to about 3 microns, and a cavity length of about 0.5 mm to about 5 mm. Some emitter embodiments may have a divergence of about 2 degrees to about 10 degrees on the slow axis and about 30 degrees to about 75 degrees on the fast axis. Materials for the bar 12 may include solid state materials such as GaAs, InP or the like.

Figure 2:
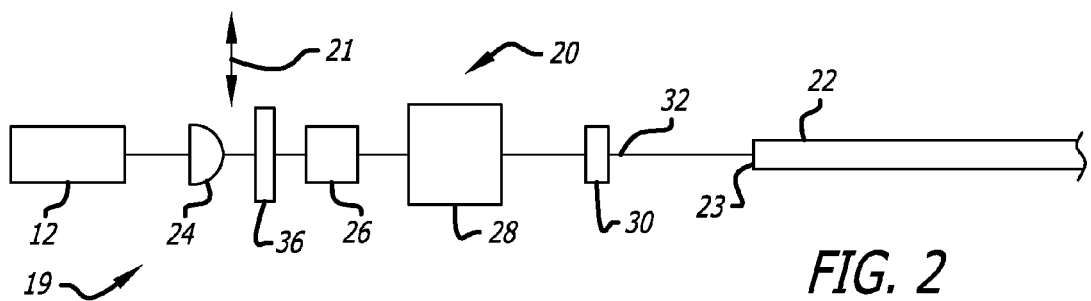
FIG. 2 is a diagrammatic view of an embodiment of a coupling system.

FIG. 2 is a diagrammatic view of a high brightness light energy source 19 including an embodiment of a coupling system 20 wherein the output of the emitters 14 of a bar, such as a laser diode bar 12, is coupled into an optical conduit in the form of an optical fiber 22 having an input surface 23. The coupling system 20 includes a fast axis collimator 24, a slow axis collimator 26, a beam transform system 28 and focusing optics 30 all disposed within the optical train 32 of at least two of the output beams of the emitters 14 of the bar 12. The fast axis collimator 24 may be a cylindrical lens disposed within the optical train 32 of the output beams configured to substantially collimate the output beams along the fast axis of the output beams. The slow axis collimator 26 may also be a cylindrical lens or lens array disposed within the optical train 32 of the output beams and configured to substantially collimate the output beams along the slow axis of the output beams. The beam transform system 28 is disposed within the optical train 32 and serves to transform the output beams of the bar 12 so as to redistribute the beams between the slow axis and the fast axis configure the beam product of the output to improve the coupling of the output beams of the emitters 14 into the optical fiber 22. Embodiments of the beam transform system 28 may include an angled reflective beam redistribution volume, a refractive offset cylindrical lens array for 90 degree beam rotation, a step mirror beam transform system or any other suitable beam transform system.

In use, the output of the emitters 14 is substantially collimated by the fast axis collimator 24 in the fast axis direction. The fast axis direction is indicated by arrow 21. The output of the emitters 14 is then substantially collimated in the slow axis direction by the slow axis collimator 26. The output of each emitter 14 is then transformed by passing the output through the beam transform system 28 and, finally, the output of the emitters is condensed or otherwise focused by the focusing optics into an input surface 23 of the fiber optic 22. The output of the emitters 14 of the bar 12 may also be wavelength locked by passing the output through a wavelength locking element, such as volume Bragg grating (VBG) 36. The input surface 23 of the fiber optic 22 may have a particular acceptance angle or solid angle of acceptance indicated by the numerical aperture of the fiber optic 22. Some embodiments of the fiber optic may have a numerical aperture of about 0.11 to about 0.37, corresponding to an acceptance angle of about 6 degrees to about 22 degrees.

Figure 3:
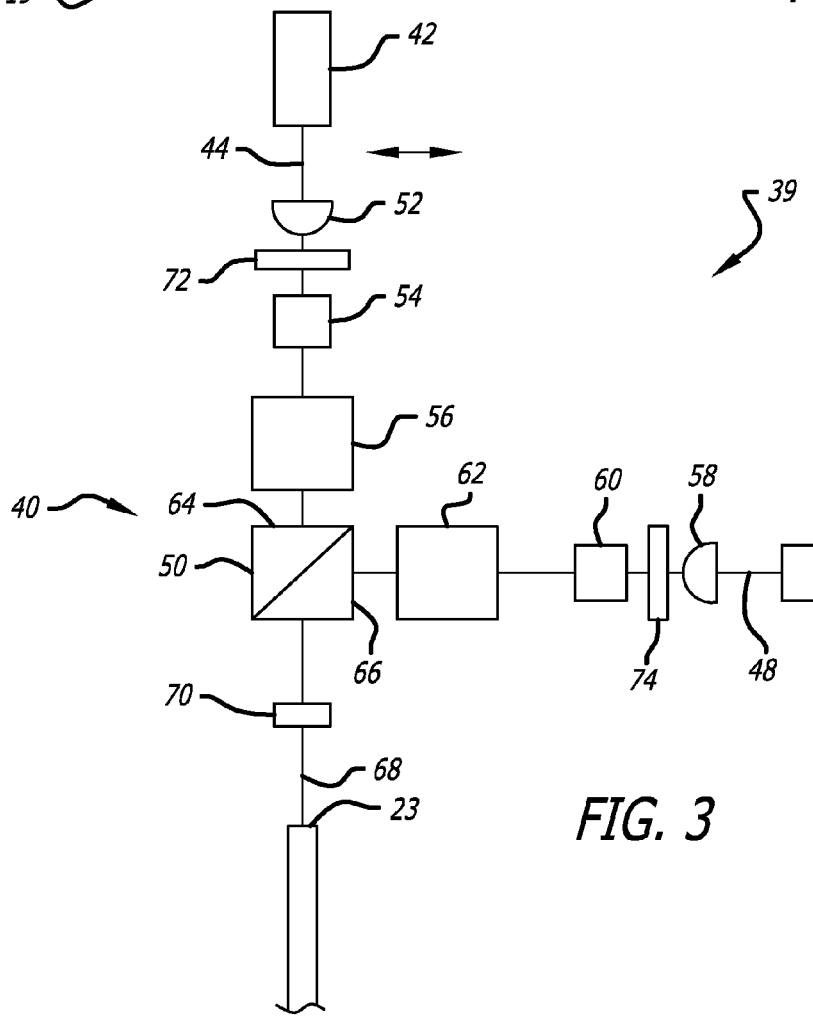
FIG. 3 is a diagrammatic view of an embodiment of a coupling system including two laser diode bars and a beam combiner.

FIG. 3 is a diagrammatic view of a high brightness light energy source 39 including an embodiment of a coupling system 40 that may be used to couple at least two output beams of two solid state emitters 14 of a first bar 42 having a plurality of emitters 14 and of a second bar 46 having a plurality of emitters 14. The first bar 42 also has a first optical axis 44 corresponding to an output of the emitters 14 and the second bar 46 has a second optical axis 48 corresponding to an output of the emitters 14 of the second bar 46. The coupling system 40 may also include a beam combiner 50. A first fast axis collimator 52, first slow axis collimator 54 and first beam transform system 56 are disposed within the first optical axis 44. A second fast axis collimator 58, second slow axis collimator 60 and second beam transform system 62 are disposed within the second optical axis 48. The beam combiner 50, which may be a polarization beam combiner for some embodiments, has a first input 64 optically coupled to an output of the first bar 42 on the first optical axis 44 and a second input 66 coupled to an output of the second bar 46 on the second optical axis 48 and an output axis 68. Focusing optics 70 are optically coupled to the output axis 68 of the beam combiner 50.

In some embodiments, the first optical axis 44 and the second optical axis 48 are substantially orthogonal to each other and the first optical axis 44 and the output axis 68 of the beam combiner 50 are substantially collinear. In addition, the output beams of the first and second bars 42 and 46 may be wavelength locked by a first VBG 72 disposed within the first optical axis 44 and a second VBG 74 disposed within the second optical axis 48. At least one of the first and second beam transform systems 56 and 62 may include an angled reflective beam redistribution volume, a refractive offset cylindrical lens array for 90 degree beam rotation, a step mirror beam transform system, or any other suitable beam transform system.

FIGS. 4 and 5 illustrate an embodiment of a high brightness light energy source 79 including a coupling system 80 utilizing an angled reflective beam redistribution volume 82 as a beam transform system 84. A single bar 12 is shown emitting ten output beams 86 from ten emitters 14 into the coupling system 80. The beams 86 are emitted with a fast axis direction as indicated by arrow 87 in FIG. 4. The coupling system 80 includes a fast axis collimator 88, a slow axis collimator 90 which may be a slow axis collimation array, the beam transform system 84 and focusing optics 92. The output of the bar 12 may optionally be wavelength locked with a wavelength locking element which may be a VBG 36 or any other suitable device. In the embodiment shown, an optional beam combiner 94 in the form of a polarization beam combiner is disposed within the optical train 96 of the coupling system 80 between the beam transform system 84 and the slow axis collimator 90. The polarization beam combiner 94 serves to fold five of the collimated output beams 86 onto or in close proximity to five adjacent collimated output beams 86. This folding or collapsing of some of the output beams 86 reduces the output wave front profile of the emitter output and facilitates coupling to an input surface 23 of a small optical conduit such as optical fiber 22.

Referring to FIG. 5, ten separate output beams 86 are emitted along the optical axis or train 96 from bar 12 having a slow axis as indicated by arrow 98. The ten beams 86 are emitted from the bar 12 and are substantially collimated in the fast axis direction by passing through fast axis collimator 88. After passing through the fast axis collimator 88, the output beams 86 then pass through the optional wavelength locking element or VBG 36. The VBG 36 provides optical feedback to the emitters 14 of the bar 12 that may be configured to wavelength lock or substantially wavelength lock the output of the emitters 14 at a desired wavelength, wavelengths or range of wavelengths. Suitable VBGs 36 may be formed from refractive materials having periodic perturbations formed within the material. Such periodic perturbations may be regular throughout the volume or may vary from zone to zone of the VBG 36, such as in a chirped VBG embodiment.

Figure 9:
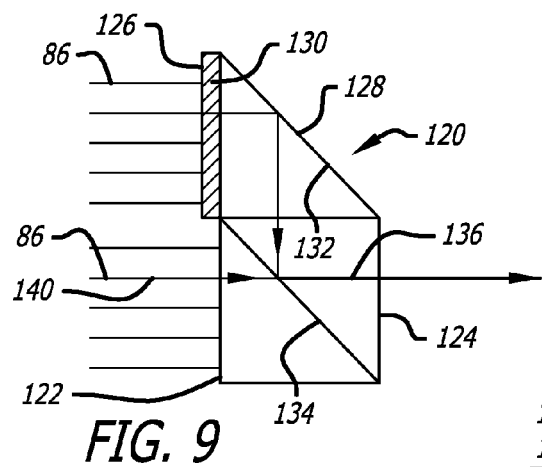
FIG. 9 is an elevational side view of an embodiment of a polarization beam combiner.
Figure 10:
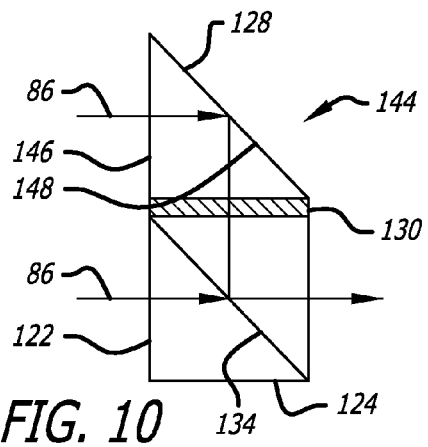
FIG. 10 is an elevational side view of an embodiment of a polarization beam combiner.
Figure 11:
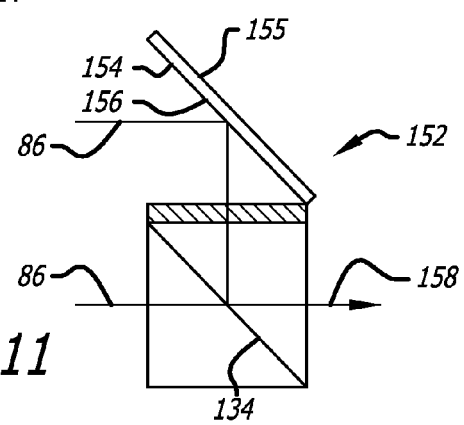
FIG. 11 is an elevational side view of an embodiment of a polarization beam combiner.

The VBG 36 may be configured to provide a predetermined percentage of feedback to the emitters 14 of the bar 12 in order to allow sufficient transmission of the output beams 86 through the VBG 36 while still efficiently wavelength locking the output of the emitters 14. Some VBG embodiments may be configured to produce optical feedback of about 2 percent to about 10 percent of total emitter output energy. Output beams transmitted through the VBG 36 then pass through the slow axis collimator 90 which substantially collimates the output beams 86 along the slow axis of the beams 86. All ten output beams 86 then propagate to the optional polarization beam combiner 94. As discussed above, the polarization beam combiner 94 redirects or folds 5 of the 10 output beams 86 so as to be superimposed onto or in close proximity to 5 other output beams 86. As shown in FIG. 5, ten output beams 86 are shown entering the polarization beam combiner 94 and 5 output beams 86 are shown exiting the polarization beam combiner 94. However, the 5 output beams 86 shown exiting the polarization beam combiner 94 represent all ten output beams 86 but with each of the five lines shown exiting the beam combiner 94 representing two output beams substantially superimposed and propagating parallel to each other. Several embodiments of polarization beam combiners 94 are illustrated in FIGS. 9-11 and discussed in more detail below.

Figure 6:
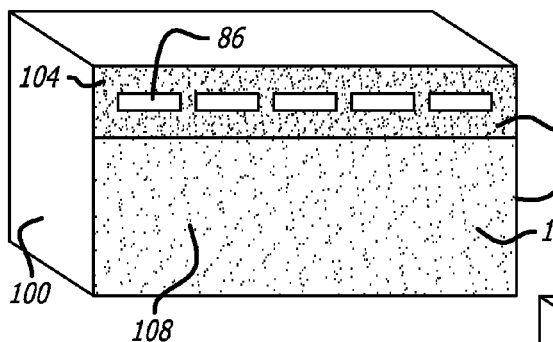
FIG. 6 is a perspective view of an input surface of an embodiment of an angled reflective beam redistribution volume.
Figure 7:
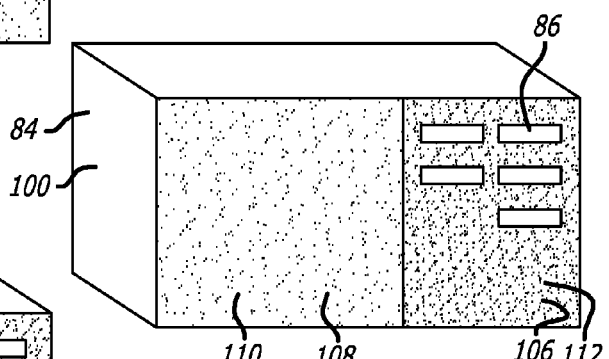
FIG. 7 is a perspective view of an output surface of the angled reflective beam redistribution volume of FIG. 6 illustrating an embodiment of a configuration of output beams.
Figure 8:
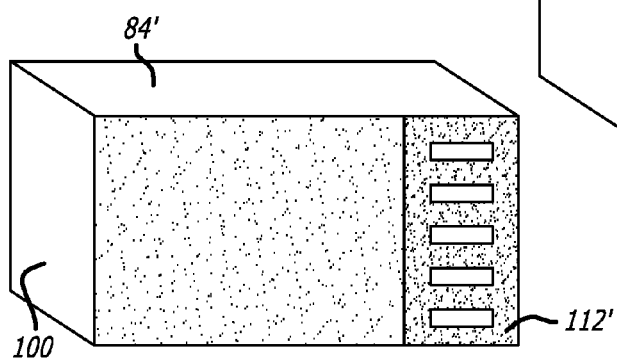
FIG. 8 is a perspective view of an output surface of the angled reflective beam redistribution volume of FIG. 6 illustrating an embodiment of a configuration of output beams.

The five superimposed output beams 86 exiting the beam combiner 94 then enter the beam transform system 84 which for the embodiment shown is an angled reflective beam redistribution volume. Angled reflective beam redistribution volumes such as those developed by researchers at the University of South Hampton, University Road, Southhampton, U.K. are suitable for use in coupling systems such as coupling system 80. Referring to FIGS. 6-8, such embodiments of angled reflective beam redistribution volumes 84 may include orthogonally oriented elongate apertures on opposing parallel surfaces of a beam redistribution volume 100 that may be made of a refractive solid such as glass or silica. FIG. 6 shows an input surface 102 of the angled reflective beam redistribution system 84 having an input aperture 104 extending along a top portion of the input surface 102. The input aperture 104 includes an anti-reflective coating 106 that allows the 5 superimposed output beams 86 shown in FIG. 5 to enter the volume 100 of the beam transform system 84. The entire portion of the input surface 102 below the input aperture 104 is coated with a highly reflective coating 108 that promotes internal reflection of the output beams 86 within the volume 100 which are incident on this surface 102.

FIG. 7 shows an output surface 110 of the beam transform system 84 and an output aperture 112 that extends vertically along an edge of the volume 100. The output aperture 112 also has an anti-reflective coating 106 that allows the 5 superimposed output beams 86 shown in FIG. 5 to exit the volume 100 of the beam transform system 84 through the output aperture 112. The entire portion of the output surface 110 which is not contained within the output aperture 112 is coated with a highly reflective coating that promotes internal reflection within the volume 100 of the beam transform system 84. The internal reflection within the volume 100 permits some of the output beams 86 that enter the beam transform system 84 to follow a path that transforms the relative position of the output beams 86 to improve the beam wave front profile so as to better facilitate coupling and focusing of the output beams 86.

For the coupling system embodiment 80 shown in FIGS. 4-7, the beam transform system 84 is tilted on two axes relative to the optical axis 96 of the coupling system 80 such that the top 2 output beams 86 shown exiting the beam transform system 84 have passed straight through the volume 100 of the beam transform system 84 without any internal reflection within the volume 100 of the system 84. The remaining lower three output superimposed beams 86 have been subject to internal reflection and transformation such that they have been repositioned from mutually adjacent positions to the configuration shown in the output aperture 112 of FIG. 7. FIG. 8 shows an embodiment of a beam transform system 84' with a different output wave front profile from the output aperture 112' of the beam transform system 84'. Such a result may be obtained by adjusting the tilt angles of the beam transform system 84' along the two tilt axes. The length and width of the input aperture 104 and output aperture 112 and the size of the volume 100 of the beam transform system 84 may also be used to configure the profile of the output beam 86 wave front profile or configuration to maximize coupling efficiency and brightness.

FIG. 9 is an elevational side view of an embodiment of a polarization beam combiner 120. The beam combiner 120 has a first input surface 122 on a first prism body 124 and a second input surface 126 on a second prism body 128 having a half wave plate 130 disposed at the second input surface 126. The half wave plate 130 alters the polarization of the incident output beams 86 thereon such that the output beams 86 will be reflected by a first reflective surface 132 of the second prism body 124 and also by the boundary surface 134 of the first prism body 124, as shown by arrow 136. The unaltered polarization of the output beams 86 incident on the first input surface 122, as indicated by arrow 138, allows the output beams 86 to pass through the boundary surface 134 of the first prism body 124 as shown by arrows 140. This arrangement allows the beam combiner 120 to fold or superimpose the output beams 86 onto each other or into close proximity to each other while maintaining the relative parallel axis of the output beams 86.

FIG. 10 is an elevational side view of an embodiment of a polarization beam combiner 144 having a configuration that is similar in some respects to the configuration of the polarization beam combiner 120 shown in FIG. 9. Beam combiner 144 has a first input surface 122 on a first prism body 124 similar to the first prism body 124 of the embodiment shown in FIG. 9. A second input surface 146 on the second prism body 128 does not include the half wave plate 130. Instead, the half wave plate 130 is disposed between the first and second prism bodies 124 and 128 as shown. The effect at the boundary surface 134 of the first prism body 124 is the same wherein the output beams 86 entering the first input surface 122 are allowed to pass through the boundary surface 134 while the output beams 86 entering the second input surface 146 are reflected by a rear surface 148 of the second prism body 128 and subsequently reflected at the boundary surface 134 of the first prism body 124.

FIG. 11 is an elevational side view of an embodiment of a polarization beam combiner 152 that is similar to the beam combiner 144 of FIG. 10 except that a reflective surface 154 of a mirror element 155 is used in place of the second prism body 128 and the reflective surface 154 represents a second input surface 156. Once again, the effect at the boundary surface 134 of the first prism body 124 is the same wherein the output beams 86 entering the first input surface 122 are allowed to pass through the boundary surface 134 while the output beams 86 reflected from the second input surface 156 are again reflected at the boundary surface 134 of the first prism body 124 as shown by arrows 158 so as to superimpose or otherwise rearrange the output beams in a more condensed or concentrated output wave front profile or configuration improving the coupling and brightness of the output.

For some embodiments of the coupling system 80 that do not use a beam combiner 94, 10 emitters having a width of about 100 microns and a height of about 1 microns on about a 1 mm pitch may be used. Such an emitter array may have an initial beam parameter product (defined by half the size multiplied by the tangent of the half angle of the axis) of 0.3 mm·mrad derived from beam parameters of 1 micron by 64 degrees divergence with 5 cuts from the beam transform system 84 going into 1.5 mm·mrad. The initial slow axis beam parameter product may be 31 mm·mrad derived from beam parameters of 100 micron times 7 degrees times 10 emitters, with 5 cuts from the beam transform system 84. A fiber optic 22 having a core diameter of about 100 microns to about 110 microns and a numerical aperture of about 0.22 can accept a beam parameter product of about 0.05 mm times 220 mrad which is about 11 mm·mrad. If a polarization beam combiner 94 is added to the coupling system 80, the same emitter parameters may yield a fast axis collimation result of about 12 mrad and a slow axis collimation of about 12.5 mrad. The polarization beam combiner 94 produces a 5 mm beam width times 12.5 mrad and a 300 micron beam height times 12 mrad. The beam transform system 84 produces with a 5 factor stacking 1 mm times 12.5 mrad width and 1.5 mm times 12 mrad height. This beam can be focused with a 4.5 mm focal length lens 92 into fiber optic 22 having a numerical aperture of about 0.22.

FIGS. 12 and 13 illustrate an embodiment of a high brightness light energy source 159 including a coupling system 160 utilizing a refractive offset cylindrical lens array for 90 degree beam rotation as a beam transform system 162. A single bar 12 is shown emitting ten output beams 164 from ten emitters 14 into the coupling system 160. The output beams have a fast axis direction indicated by arrow 161. The coupling system 160 includes a fast axis collimator 166, a slow axis collimator 168 which may be a singlet optic, the beam transform system 162 and focusing optics 170. The output 164 of the bar 12 may optionally be wavelength locked with a wavelength locking element 36 which may be a VBG or any other suitable device. In the embodiment shown, an optional beam combiner 172 in the form of a polarization beam combiner is disposed within an optical train 174 of the coupling system 160 between the beam transform system 162 and the focusing optics 170.

Referring to FIG. 13, ten separate output beams 164 are emitted along the optical axis 174 from bar 12 having a slow axis as indicated by arrow 176. The ten output beams 164 exit the bar 12 and are substantially collimated in the fast axis direction by passing the output beams 164 through the fast axis collimator 166. After passing through the fast axis collimator, the beams then encounter the optional wavelength locking element or VBG 36. The VBG 36 provides optical feedback to the emitters 14 of the bar 12 that may be configured to wavelength lock or substantially wavelength lock the output of the emitters 14 at a desired wavelength, wavelengths or range of wavelengths.

The 10 output beams 164 then enter the beam transform system 162 which is a refractive offset cylindrical lens array. A refractive offset cylindrical lens array for 90 degree beam rotation such as produced by LIMO GmbH, Bookenburgeweg 4-8, Dortmund, Germany, may be used as such a beam transform system. Such embodiments of refractive offset cylindrical lens array, as shown in more detail in FIGS. 14 and 15, may include diagonally oriented cylindrical lens elements 178 that are symmetrically disposed on opposing parallel surfaces of a transmissive block or substrate 180 that may be made of a refractive solid such as glass or silica.

Figure 14:
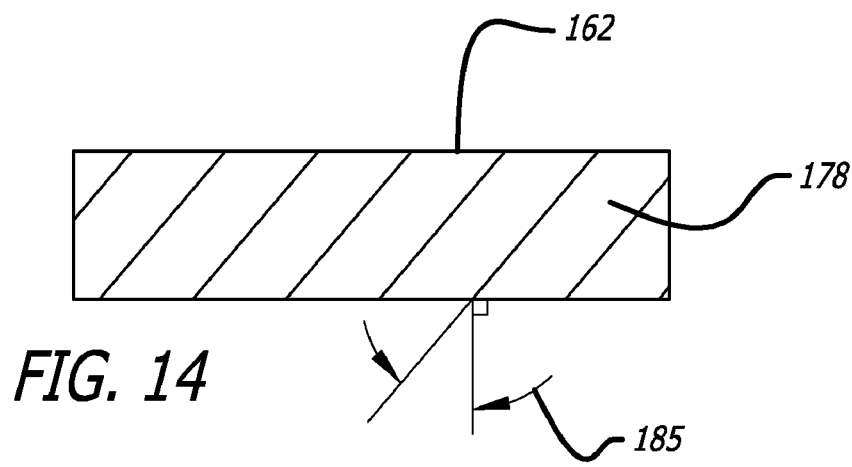
FIG. 14 is an elevational view of a refractive offset cylindrical lens array for 90 degree beam rotation as included in the coupling device of FIGS. 12 and 13.
Figure 15:
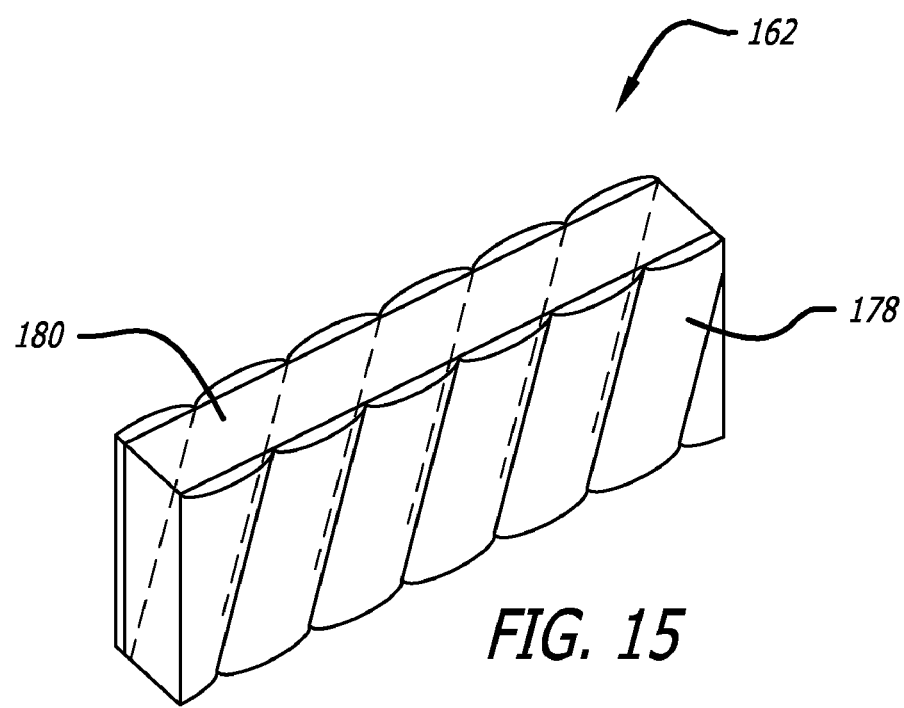
FIG. 15 is a perspective view of the refractive offset cylindrical lens array for 90 degree beam rotation of FIG. 14.

FIG. 14 is an elevational view of a refractive offset cylindrical lens array 162 for 90 degree beam rotation as included in the coupling system 160 of FIGS. 12 and 13. FIG. 15 is a perspective view of the refractive offset cylindrical lens array 162. The transmissive block 180 may be sized such that any opposing symmetrical pair of cylindrical lens elements 178 focus at the same point or line within the body of the transmissive block 180. Such a configuration will rotate an incident output beam by approximately 90 degrees, such that the fast axis and slow axis of the output beam are reversed as shown by arrow 182 indicating the slow axis of the output beams 164 before the beam transform system 162 and arrow 184 indicating the fast axis of the output beams 164 after the beam transform system 162. The rotation of the individual output beams 164 symmetrizes the beam product and beam profile between the fast axis and slow axis and facilitates subsequent focusing or concentration of the output beams while maintaining brightness. The slant or angular orientation of the cylindrical lens elements 178 of the beam transform system 162 may be set to an angle of about 40 degrees to about 50 degrees, as indicated by arrows 185 in FIG. 14. Once the output beams 164 have passed through the beam transform system 162, they pass through the slow axis collimator 168. Because the fast and slow axes of the output beams 164 have been reversed, the slow axis collimator 168 disposed after the beam transform system 162 may be a singlet cylindrical lens.

After transmission through the slow axis collimator 168, all ten output beams then propagate to the optional polarization beam combiner 172. The polarization beam combiner 172 redirects or folds 5 of the 10 output beams 164 onto or in close proximity to 5 other output beams 164. As shown in FIG. 13, ten output beams 164 are shown entering the polarization beam combiner 172 and only 5 output beams 164 are shown exiting the polarization beam combiner 172. The 5 beams 164 shown exiting the polarization beam combiner 172 represent all ten output beams 164 but with each of the five output beams 164 shown representing two output beams 164 substantially superimposed and propagating parallel to each other. The spatial folding or superposition of the output beams 164 facilitates subsequent condensing or focusing of the output beams 164 into the input surface 23 of optical conduit 22 by focusing optics 170. If the polarization beam combiner 172 is not used in the coupling system 160, the output beams 164 may still be coupled into the optical conduit 22, however a larger focusing optic or optics 170 may need to be used. A pair of cylindrical lenses may be used for such focusing.

For some embodiments of the coupling system 160 that use a beam combiner 172, 10 emitters having a width of about 135 microns and a height of about 1 microns on about a 0.5 mm pitch may be used. After fast axis collimation and beam transformation through the beam transform system 162, the beam may be collimated on the slow axis by a 21 mm focal length lens resulting in a beam about 5 mm by 2.5 mm. The polarization beam combiner 172 then produces a beam that is about 2.5 mm by 2.5 mm. A 10 mm focal length coupling lens 170 may then be used to produce a spot of about 85 microns with a numerical aperture of about 0.18, which is suitable for coupling to a fiber optic 22 having an input diameter of about 100 microns to about 110 microns and a numerical aperture of about 0.22.

Figure 16:
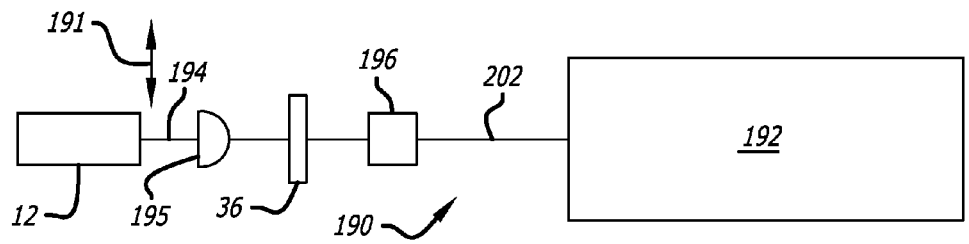
FIG. 16 is a side diagrammatic view of an embodiment of a coupling device including a step-mirror beam transform system.
Figure 17:
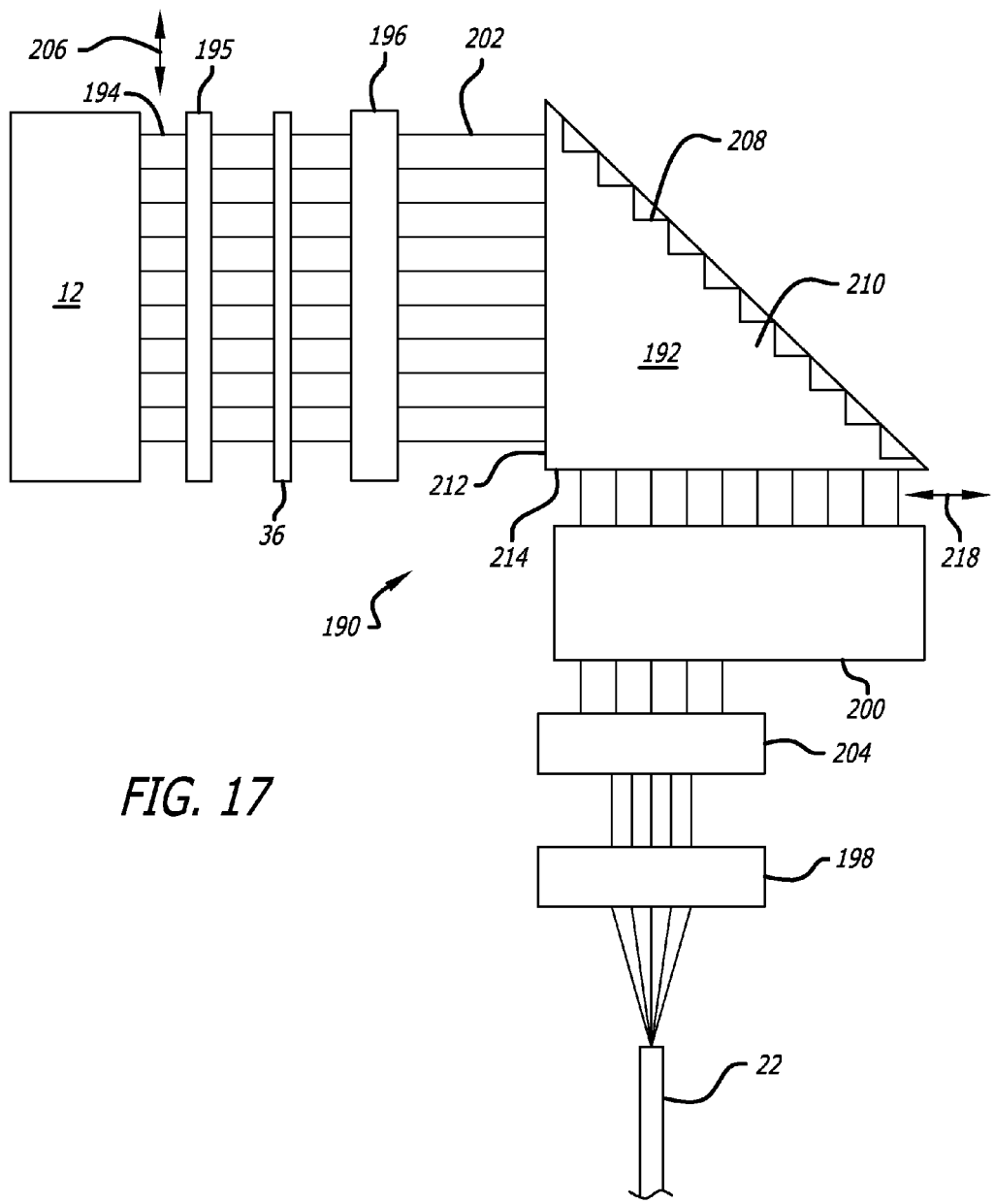
FIG. 17 is a top diagrammatic view of the coupling device of FIG. 16.

FIGS. 16 and 17 illustrate an embodiment of a high brightness light energy source 189 including a coupling system 190 utilizing a step mirror beam transform system as a beam transform system 192. A single bar 12 is shown emitting ten output beams 194 from ten emitters 14 into the coupling system 190. The fast axis direction of the output beams is indicated by arrow 191 in FIG. 16. The coupling system includes a fast axis collimator 195, a slow axis collimator 196 which may be an array, the beam transform system 192 and focusing optics 198. The output of the bar 12 may optionally be wavelength locked with a wavelength locking element 36 which may be a VBG or any other suitable device. In the embodiment shown, an optional beam combiner 200 in the form of a polarization beam combiner is disposed within an optical train 202 of the coupling system 190 between the beam transform system 192 and the focusing optics 198. The coupling system embodiment 190 shown also includes an optional telescope 204 disposed within the optical train 202 between the beam transform system 192 and focusing optics 198 that may be used, particularly where the optional beam combiner 200 is not included in the optical train 202 of the coupling system 190.

Referring to FIG. 17, ten output beams 194 are emitted along the optical axis 202 from bar 12 having a slow axis direction indicated by arrow 206. The ten output beams 194 exit the bar 12 and are substantially collimated in the fast axis direction by passing the output beams 194 through the fast axis collimator 195. After passing through the fast axis collimator 195, the output beams 194 then pass through the optional wavelength locking element 36. The VBG provides optical feedback to the emitters of the bar that may be configured to wavelength lock or substantially wavelength lock the output of the emitters at a desired wavelength, wavelengths or range of wavelengths. The wavelength locking element may have any or all of the features, dimensions or materials of the wavelength locking elements discussed above. Output beams 194 transmitted through VBG 36 then pass through the slow axis collimator 196 which substantially collimates the output beams 194 along the slow axis of the output beams 194.

The ten substantially collimated output beams 194 are then directed to the beam transform system 192 which is a step mirror beam transform system 192. A step mirror beam transform system such as the V-Step Module produced by Ingeneric GmbH, Dennewartstrasse 25-27, Aachen, Germany, may be used as a beam transform system 192. Such a beam transform system 192 may be used for transforming the output beam 194 of each individual emitter 14 of a laser diode bar 12 through rotation of approximately 90 degrees so as to reverse or exchange the fast and slow axis direction of each output beam 194. Such embodiments of a step mirror beam transform system 192, the function of which is shown in more detail in FIG. 18, may include angled reflective surfaces generated on an optically active surface or edge 208 of a transmissive or refractive block of material 210 made from materials such as glass, silica or the like. The step mirror beam transform system 192 includes an input surface 212, an output surface 214 and the optically active edge 208 that includes matched pairs of slanted reflective surfaces. The matched pairs of reflective surfaces are disposed in a relationship with each other in a design configured to fold each output beam 194 on itself so as to reverse the fast and slow axis of the output beam 194 while maintaining the relative position and parallel propagation between the output beams 194.

Such a beam transform system 192 configuration will rotate an incident output beam 194 by approximately 90 degrees as shown by arrow 206 indicating the slow axis direction of the output beams 194 before the beam transform system 192 and arrow 218 indicating the fast axis direction of the output beams 194 after transmission through the beam transform system 192. The rotation of the individual output beams 192 improves the beam product and beam profile and facilitates subsequent focusing or concentration of the output beams while maintaining brightness. A conceptual rendering of the operation of the matched reflective surfaces of the step mirror beam transform system 192 is shown in FIG. 18.

Figure 18:
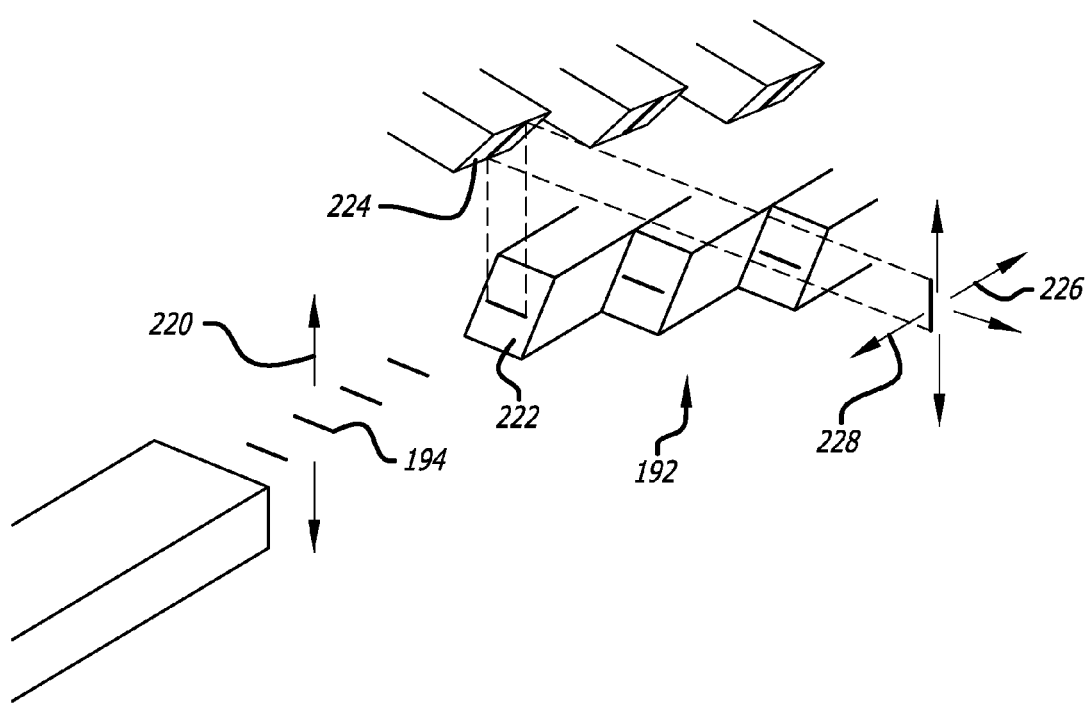
FIG. 18 is a perspective diagrammatic view of a portion of a step-mirror beam transform system illustrating the transformation between the fast axis and slow axis of an output beam of a laser bar.

In FIG. 18, an output beam 194 having a fast axis direction indicated by arrow 220 is shown propagating toward a first reflective surface 222 of a step mirror beam transform system 192. Upon contact with the first reflective surface 222, the output beam 194 is reflected upward toward a second reflective surface 224 which is slanted in the opposite direction to the first reflective surface 222 and has an angular orientation of the slanted second reflective surface 224 that is rotated by about 85 degrees to about 95 degrees with respect to the first slanted surface 222. The output beam 194 reflected by the second reflective surface 224 now has a fast axis orientation, indicated by arrow 226, that is substantially orthogonal to the fast axis of the output beam 194 prior to reflection by the first reflective surface 222 and second reflective surface 224. The slow axis direction of the reflected output beam 194 is indicated by arrow 228. After transmission through the beam transform system 192, all ten output beams 194 then pass through the optional polarization beam combiner 200. As discussed above, the polarization beam combiner 200 redirects or folds output beams 194 in half. The spatial folding or superposition of the output beams 194 facilitates subsequent condensing or focusing of the output beams 194 into the optical conduit 22 by focusing optics 198.

The folded or superimposed output beams 194 are then directed to the optional telescope element 204. The telescope element 204 serves to concentrate the output beams 194 while maintaining the parallel propagation thereof. The telescope element 204 may be particularly useful in coupling system embodiments 190 that do not incorporate the use of the optional polarization beam combiner 200 shown. In such a case, the ten output beams 194 distributed across the output surface of the beam transform system 192 would need to be coupled to the optical conduit 22, and the telescope element 204 would be useful in further concentrating the output beams 194 prior to focusing the output beams 194. For embodiments using the telescope element 204, the concentrated or condensed output beams 194 exiting the telescope element 204 are then focused by the focusing optics 198 and coupled to the optical conduit 22. The focusing optics 198 may include a pair of cylindrical lenses. Some embodiments of the telescope element may have a reduction power of about 2 to about 5.

For some embodiments of the coupling system 190 that use a beam combiner 200, 10 emitters having a width of about 100 microns and a height of about 1 microns on about a 1 mm pitch may be used. Such an emitter array may have an initial beam parameter product (defined by half the size multiplied by the tangent of the half angle of the axis) of 0.3 mm·mrad derived from beam parameters of 1 micron by 64 degrees divergence with 10 cuts from the beam transform system 192 going into 3 mm·mrad. The initial slow axis beam parameter product may be 31 mm·mrad derived from beam parameters of 100 micron times 7 degrees times 10 emitters, with 10 cuts from the beam transform system 192. The beam combiner 94 added to the coupling system 190 will double the brightness of the beam while maintaining the same beam parameter product.

With regard to the above detailed description, like reference numerals used therein refer to like elements that may have the same or similar dimensions, materials and configurations. While particular forms of embodiments have been illustrated and described, it will be apparent that various modifications can be made without departing from the spirit and scope of the embodiments of the invention. Accordingly, it is not intended that the invention be limited by the forgoing detailed description.

What is claimed is:

1. A coupling system for coupling at least two output beams of solid state emitters, comprising a first fast axis collimator disposed within a first optical axis;
a first slow axis collimator disposed within the first optical axis;
a first angled reflective beam redistribution volume disposed within the first optical axis;
a first VBG disposed within the first optical axis; and
a second fast axis collimator disposed within a second optical axis;
a second slow axis collimator disposed within the second optical axis;
a second angled reflective beam redistribution volume disposed within the second optical axis;
a second VBG disposed within the second optical axis;
a polarization beam combiner having a first input optically coupled to the first optical axis and a second input coupled to the second optical axis and an output axis; and
focusing optics optically coupled to an output axis of the beam combiner.

* * * * *